Sept. 14, 1926.    B. M. COFFEE    1,599,954

BELT CONNECTING DEVICE

Filed May 28, 1925

INVENTOR
Bassett M. Coffee
BY Robert S. Blair
ATTORNEY

Patented Sept. 14, 1926.

1,599,954

UNITED STATES PATENT OFFICE.

BASSETT M. COFFEE, OF NEW HAVEN, CONNECTICUT, ASSIGNOR TO THE SAFETY CAR HEATING & LIGHTING COMPANY, A CORPORATION OF NEW JERSEY.

BELT-CONNECTING DEVICE.

Application filed May 28, 1925. Serial No. 33,337.

This invention relates to belt connecting devices. One of the objects thereof is to provide a belt connection which is practical and efficient in action. Another object is to provide a device of the above nature which is strong and dependable. Another object is to provide a belt connecting device which, in action, is free from characteristics tending to distort or otherwise injure or weaken the belt. Another object is to provide a belt connection in which a dependable joint is had without causing an undue gap in the operative surface of the belt. Another object is to provide a device of the above nature which is simple and inexpensive and which may accurately be applied to the belt with the greatest convenience. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which is shown one of the various possible embodiments of this invention, Figure 1 is a side elevation;

Similar reference characters refer to similar parts throughout the several views of the drawing.

Figure 1:
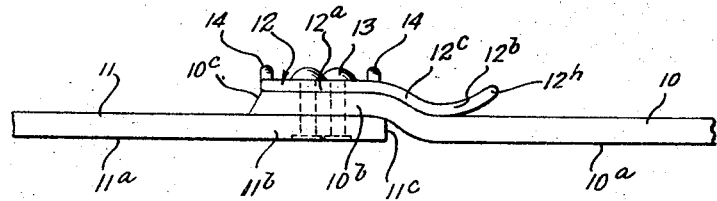

Referring now to the drawing in detail and first to Figure 1, there are shown two belt ends 10 and 11 connected together. The joint in this embodiment is shown as a lap joint, certain features of the invention being particularly adapted to the use of a lap joint, but it is to be understood that certain features of the invention in their broader aspects are applicable as well to a butt joint. The surfaces $10^a$ and $11^a$ respectively of the belts 10 and 11 are the inner or pulley-engaging surfaces thereof. The end portion $10^b$ of the belt 10 overlaps a portion $11^b$ of the belt 11, the inner surface of the part $10^b$ resting upon the outer surface of the part $11^b$.

Exterior of the belt 10 is positioned a metal plate 12. This plate 12 has a portion $12^a$ resting exterior of the overlapping parts $10^b$ and $11^b$ and a further portion $12^b$ extending from this first portion along the surface of the belt 10 beyond the end $11^c$ of the belt 11. These two parts $12^a$ and $12^b$ of the plate 12 are connected by a curved part $12^c$. This part $12^c$ curves inwardly from the part $12^a$, it being understood that by the term "inwardly" is meant in a direction toward the pulley or toward the pulley-engaging surface of the belt. The parts $12^a$ and $12^b$ are preferably substantially parallel and are offset with respect to each other to an amount substantially equal to or slightly greater than the thickness of the belt, by the connecting inwardly curved part $12^c$. Preferably, the end portion of the part $12^b$ is curved outwardly as shown at $12^h$.

The part $12^a$ of the plate 12 and the belt portions $10^b$ and $11^b$ are clamped together preferably by a staggered row of rivets 13. Thus the part $12^b$ of the plate, engaging the outer surface of the belt 10 beyond and adjacent to the end $11^c$ of the belt 11, urges this portion of the belt 10 inwardly toward parallelism with the belt 11. The effect of this inward bending of the belt 10 adjacent the end of the belt 11 is to substantially reduce the gap in the operative or pulley-engaging surfaces of the connected belts. It will be seen that the gap in the pulley-engaging surface is very small compared to what it would be if the belt 10 were freed from the action of the plate portion $12^b$ and permitted to assume its natural position under tension. This reduction of the gap in the operative surface of the belt, moreover, is brought about without a tapering of the belt ends or any removal of the material thereof or weakening of the belt ends. The full thickness of each of the belt portions $10^b$ and $11^b$ is available for the passage of the rivets 13 therethrough for secure and dependable clamping. The length of the lap of the two belts may be increased as desired so that the rivets 13 may be placed as far from the ends 10° and 11° as is found expedient to avoid all possibility of their pulling out.

The friction of the overlapping parts 10ᵇ and 11ᵇ is high, the friction of belt upon belt being much higher than the friction of metal upon the belt, so that a material frictional holding is had, relieving to a substantial extent the pull upon the rivets. The parts are clamped by substantially a single row of rivets so that the connection is of maximum flexibility, accommodating itself readily to a pulley surface. Moreover, when the connection is bent in passing over a pulley, there is no tendency to bend the metal plate and no sharp transverse bending of the belt which would tend to crack and weaken the belt. The lap joint is of particular advantage over a butt joint in that the two belts to be connected may very conveniently be alined without the necessity of the two belt ends being cut exactly squarely. In a butt joint if the two abutting ends are not exactly square, when the belt is stretched there is a tendency to tear out the rivets on one side as the belt forces itself into alinement under tension.

Figure 2:
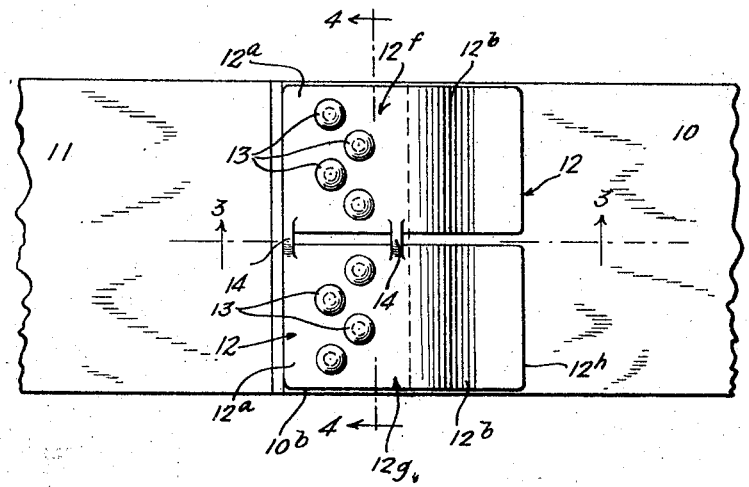
Figure 2 is a top plan view.
Figure 3:
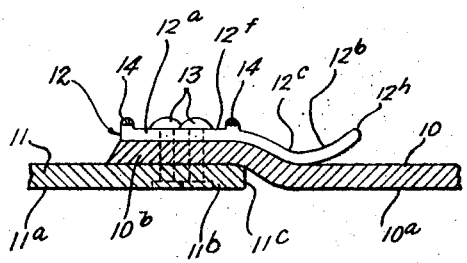
Figure 3 is a section taken substantially along the line 3—3 of Fig. 2.

Referring now to the plan view of Figure 2, the metal plate 12 when employed upon a wide belt is preferably made in the form of a plurality of plates, shown in this instance as two in number, 12ᶠ and 12ᵍ, positioned side by side transversely of the belt and rigidly connected by small necks 14, each of the plates 12ᶠ and 12ᵍ being shaped as described in connection with Figure 1. These narrow necks 14 serve to hold the two plates at proper distances apart and exactly parallel, and also serve to hold them in the correct position of alinement with respect to each other transversely of the belt, so that, together, they may be properly registered with the joint between the two sections of the belt while the connection is being made. These necks are preferably positioned one at the extreme left-hand end of the plate as viewed in Figure 2, and the other just to the left of the curved part 12°. They are preferably semi-circular in cross-section, as shown in Figure 3. These necks 14 thus constitute a temporary connection between the two plates to insure their proper positioning relative to one another, and their accurate positioning with respect to the joint when the connection is being made. These connecting necks are adapted to break when the belt is in operation.

Figure 4:
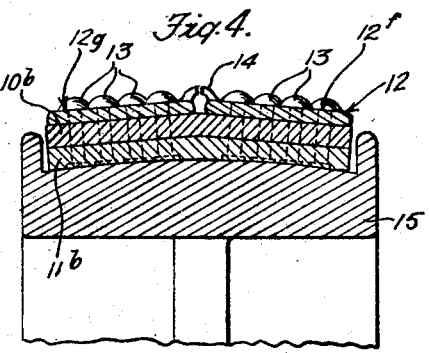
Figure 4 is a section taken substantially along the line 2—2 of Fig. 2, showing the belt upon a pulley.

Referring to Figure 4, the joint of the belt is shown passing over a crown pulley 15. The bending of the belt along its longitudinal center line, due to the crowning of the pulley surface, has resulted in the breaking of the connecting necks 14. Preferably the necks are arched upwardly as shown in this figure to avoid the possibility of their digging into the belt after being broken, as the belt bends going over a pulley and then straightens out between pulleys. Irrespective of the crowning of the pulleys over which the belt passes, the connecting necks 14 may be broken by bending of the belt due to engagement with the side flanges of the pulleys. If desired the links may be broken before the belt is placed in operation, as, for example, by means of a pair of pliers.

The plate being thus made in a plurality of sections, after breaking of the connecting necks 14 the belt is free to bend without any tendency to bend the plates. The temporary connection between the plates, afforded by the narrow connecting necks, makes possible the accurate securing of the connecting device to the belt with the greatest convenience.

From the above, it will be seen that there is herein provided a belt connection which embodies the features of this invention and attains the objects thereof, including many practical advantages. The connecting device is simple and inexpensive, necessitates the use of only a small number of rivets, and is most conveniently applied to the belt. The connecting device projects only slightly from the outer surface of the belt so that a very small clearance is required to permit passage of the belt. Localized bending of the belt is avoided, and the gap in the pulley-engaging surface of the belt is reduced to a minimum.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

I claim as my invention:

1. In a belt connecting device, in combination, a belt end, a second belt end overlapping said first belt end, means securing said two belt ends together, and means held in place by said securing means bearing against the outer surface of said overlapping belt at the portion thereof adjacent the end of said first belt and adapted when the belt is under tension to urge said portion inwardly toward substantial parallelism with said first belt.

2. In a belt connecting device, in combination, a belt end, a second belt end overlapping said first belt end, means securing said two belt ends together, and a metal plate bearing loosely against the outer surface of said overlapping belt at the portion thereof adjacent the end of said first belt and urging said portion inwardly toward substantial parallelism with said first belt.

3. In a belt connecting device, in combination, a belt end, a second belt end overlapping said first belt end, a metal plate exterior of said overlapping belt end, and means clamping said two belt ends and said metal plate together, said metal late having parts engaging the outer surface of a portion of said overlapping belt end adjacent the end of said first belt and urging said portion inwardly toward parallelism with said first belt.

4. In a belt connecting device, in combination, a metal plate adapted to be positioned upon a pair of belt ends adapted to be secured together, said metal plate having two substantially parallel portions offset by an amount substantially equal to the thickness of the belt.

5. In a belt connecting device, in combination, a metal plate adapted to be positioned upon a pair of belt ends adapted to be secured together, said metal plate having two substantially parallel portions offset by an amount substantially equal to the thickness of the belt and connected by a curved portion.

6. In a belt connecting device, in combination, a metal plate adapted to be positioned upon a pair of belt ends adapted to be secured together, said metal plate having two substantially parallel portions offset by an amount substantially equal to the thickness of the belt, one of said substantially parallel portions having means for accommodating clamping devices.

7. In a belt connecting device, in combination, a belt end, a second belt end overlapping said first belt end, and a metal plate exterior of said second belt end having a part resting over the overlapping portions of said belts and another part engaging the outer surface of a portion of said second belt adjacent the end of said first belt, said last part being offset inwardly relative to said first part by an amount substantially equal to the thickness of the belt.

8. In a belt connecting device, in combination, a belt, end, a second belt end overlapping said first belt end, a metal plate exterior of said second belt end having a part resting over the overlapping portions of said belts and another part engaging the outer surface of a portion of said second belt adjacent the end of said first belt, said last part being offset inwardly relative to said first part by an amount substantially equal to the thickness of the belt, and securing devices passing through said first part of said metal plate and through said overlapping belt ends.

9. In a belt connecting device, in combination, a belt end, a second belt end overlapping said first belt end, and a metal plate exterior of said second belt and having a part resting over the overlapping portions of said belts and another part substantially parallel to said first part engaging the outer surface of a portion of said second belt adjacent the end of said first belt, said last part being offset inwardly relative to said first part by an amount substantially equal to the thickness of the belt and being connected with said first part by a curved part.

10. In a belt connecting device, in combination, a plurality of metal plates adapted to form a part of a joint between two overlapping belt ends, said plates being adapted to be positioned upon the belt in spaced relation transversely of the belt and being elongated so that they are adapted to project along the belt beyond the lap, and means for holding said plates in parallelism and spaced a predetermined distance apart as they are secured in place upon the belt.

11. In a belt connecting device, in combination, a plurality of metal plates adapted to form a part of a joint between two connected belt ends, and a temporary rigid connection between said plates adapted to hold them in predetermined relative positions as they are secured in place upon the belt.

12. In a belt connecting device, in combination, a plurality of metal plates adapted to form a part of a joint between two connected belt ends, and connecting means between said plates adapted to hold them in predetermined relative positions as they are secured in place upon the belt, said connecting means being adapted to be broken when the belt is placed in operation.

13. In a belt connecting device, in combination, a pair of metal plates adapted to form a part of a joint between a pair of belt ends and adapted to be positioned side by side one on either side of the longitudinal center line of the belt, and breakable connecting means between said two plates adapted to hold them in parallelism and properly spaced as they are secured in position upon the belt.

14. In a belt connecting device, in combination, a plurality of metal plates adapted to form a part of a joint between two connected belt ends, and breakable connecting means between said plates adapted to hold them in predetermined relative positions as they are secured in place upon the belt, said connecting means being arched so that when broken it does not tend to dig into the belt.

15. In a belt connecting device, in combination, a pair of metal plates adapted to form a part of a joint between a pair of belt ends and adapted to be positioned side by side on either side of the longitudinal center line of the belt, and a breakable connecting member between said two plates adapted to hold them in parallelism and in properly spaced relation as they are secured in position upon the belt, said connecting member being arched upwardly so that when broken it does not tend to dig into the belt.

16. In a belt connecting device, in combination, a belt end, a second belt end overlapping said first belt end, a metal plate exterior of said second belt end having a part positioned over the lap and another part extending along said second belt end beyond the lap, said last part being curved inwardly, said first part being secured to the belt and said last part resting loosely against the belt surface.

17. In a belt connecting device, in combination, a belt end, a second belt end overlapping said first belt end, and a pair of metal plates exterior of said second belt end, one on either side of the center line of the belt, said plates each having parts positioned over the lap and parts extending along the second belt beyond the lap, said last parts being curved inwardly, said first parts being secured to the belt and said last parts resting loosely against the belt surface.

18. In a belt connecting device, in combination, a belt end, a second belt end overlapping said first belt end, a pair of metal plates exterior of said second belt end, one on either side of the center line of the belt, said plates each having parts positioned over the lap and parts extending along the second belt beyond the lap, said last parts being curved inwardly, said first parts being secured to the belt and said last parts resting loosely against the belt surface, and breakable means forming a temporary connection between said two metal plates to hold them in predetermined position with respect to one another as they are secured in place upon the belt.

In testimony whereof, I have signed my name to this specification this 14th day of May, 1925.

BASSETT M. COFFEE.